O. NETTLEFOLD.
DEVICE FOR LOCKING NUTS AND THE LIKE.
APPLICATION FILED JAN. 12, 1921.
1,415,681. Patented May 9, 1922.
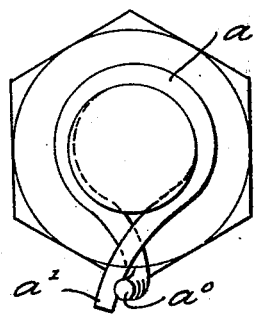
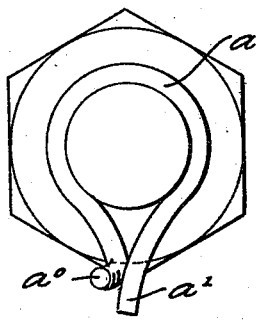
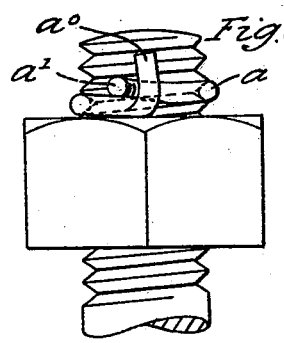
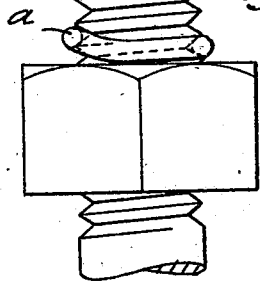
Inventor
Oswald Nettlefold
By
Attorney

UNITED STATES PATENT OFFICE.

OSWALD NETTLEFOLD, OF LONDON, ENGLAND.

DEVICE FOR LOCKING NUTS AND THE LIKE.

1,415,681.

Specification of Letters Patent. Patented May 9, 1922.

Application filed January 12, 1921. Serial No. 436,756.

*To all whom it may concern:*

Be it known that I, OSWALD NETTLEFOLD, a subject of the King of Great Britain, residing in London, England, have invented certain new and useful Improvements in Devices for Locking Nuts and the like, of which the following is a specification.

This invention relates to devices for locking nuts and the like of the kind which consists of a metal band embracing the bolt or stud to which the nut or the like is applied and in the lock-fast position closely engaging and cross-threading the thread of the bolt immediately beyond or outside the nut. In a prior application of the present applicant the locking device is secured by anchoring it to the nut, one or both ends of the band or wire being bent over to project beyond the face of the nut with this object.

In the improved device which constitutes the present invention an effective lock is obtained without so bending over one or both ends of the wire to anchor the device to the nut, viz making the locking band or wire with one end turned upwards or outwards, i. e. away from the outer face of the nut, and leaving the other end to project beyond the upturned end, so that it can be sprung over the latter to place the band in tension and cross-threading the thread of the bolt or stud. When the tension is taken off by releasing the two ends of the wire, the nut and its locking device can be readily unscrewed.

In the accompanying drawings illustrating the invention Figs. 1 and 2 are plan views of a bolt and nut showing the locking device in the lock-fast and the released positions respectively; and Figs. 3 and 4 are front and rear elevations of same showing the locking device in the lock-fast position.

The locking band is therein shown as a loop $a$ of wire, usually of spring steel, bent approximately to the diameter of the bolt to which it is designed to be applied and having one end $a^0$ turned outwardly or upwardly at right angles to the face of the nut, while the other end $a'$ projects beyond the upwardly turned end. When the ends of the band are in the relation shown in Fig. 2 the nut and the band $a$ with it can be screwed and unscrewed on the bolt, but when the projecting end $a'$ is sprung over the upturned end $a^0$ so as to interlock therewith, as shown in Figs. 1, 3 and 4, the nut is locked securely against accidental unscrewing.

Other means than those described for locking the two ends of the band together can be adopted without departing from the invention, so long as the band or wire is held in tension in the lock-fast position in the grooves of the bolt or nut but cross-threading the same at one or more points.

Having thus described the nature of the said invention and the best means I know of carrying the same into practical effect, I claim :—

1. A device for locking nuts or the like, consisting of a metal band adapted to seat itself in the grooves of the screw thread of the bolt or stud to which the nut or the like is applied and having its ends shaped to interlock with each other in the lock-fast position with the band closely engaging and cross-threading the thread of the bolt.

2. A device for locking nuts or the like, consisting of a spring band of metal formed to engage the thread of the bolt or stud to which the nut or the like is applied and having one end turned outwards from the face of the nut to be locked and the other end projecting beyond the upturned end over which it is sprung to interlock therewith and cause the band to cross-thread the thread of the bolt, substantially as described.

In testimony whereof I have signed my name to this specification.

OSWALD NETTLEFOLD.